United States Patent [19]

Tatsumi et al.

[11] 4,181,923
[45] Jan. 1, 1980

[54] CERAMIC TRIMMER CAPACITOR

[75] Inventors: Toshio Tatsumi, Daito; Tadashi Otani, Yao; Masami Yamazi, all of Osaka, all of Japan

[73] Assignee: Matsushita Electric Industrial Co., Ltd., Osaka, Japan

[21] Appl. No.: 925,189

[22] Filed: Jul. 17, 1978

[30] Foreign Application Priority Data

Jul. 26, 1977 [JP] Japan .................................. 52-90000

[51] Int. Cl.² ............................................. H01G 5/06
[52] U.S. Cl. ..................................... 361/293; 361/278
[58] Field of Search ............................... 361/293, 278

[56] References Cited

U.S. PATENT DOCUMENTS

| 4,101,951 | 7/1978 | Kuze | 361/293 |
| 4,112,480 | 1/1978 | Johanson | 361/293 |

Primary Examiner—E. A. Goldberg
Attorney, Agent, or Firm—Burgess, Ryan and Wayne

[57] ABSTRACT

A ceramic trimmer capacitor comprising a cylindrical casing, a stator and a rotor comprising a rotor casing and a dielectric assembly consisting of a disk-shaped ceramic dielectric member, a semicircular dielectric layer formed upon the upper surface of the dielectric member and having a low dielectric constant less than 20 and a coefficient of thermal expansion substantially equal to the dielectric member and a rotor electrode formed on the whole surface of the dielectric member including the semicircular dielectric layer, the dielectric assembly being inserted into the rotor casing and electrically and mechanically connected thereto; the stator and the rotor being placed in the cylindrical casing and resiliently supported. Stray capacitance is almost negligible; the variable capacitance range may be considerably improved; and the mechanical strength may be increased. The ceramic trimmer capacitor is especially adapted to be used in an electronic watch.

5 Claims, 6 Drawing Figures

CERAMIC TRIMMER CAPACITOR

BACKGROUND OF THE INVENTION

The present invention relates to a ceramic capacitor especially adapted for use as a component of an electronic or quartz crystal watch.

In general, ceramic trimmer capacitors used as components in electronic or quartz crystal watches or the like comprise a stator made of an electrically insulating material such as plastic and having a semicircular stator electrode securely fixed to the upper surface thereof; a disk-shaped ceramic dielectric member attached to the upper surface of the stator, and a rotor with a semicircular recess formed in the lower surface and an adjusting member extended upwardly from the upper surface thereof; and cylindrical casing made of a metal for housing the stator, the ceramic dielectric member and the rotor and supporting them resiliently by means of projections struck out of the casing.

However, the semicircular peripheral edge of the semicircular recess of the rotor is located in an opposed relationship with the stator electrode through the ceramic dielectric member so that the stray capacitance becomes high and consequently, the variable capacitance range is reduced. In the ceramic trimmer capacitors of the type described, the areas of the electrodes must be fully utilized within limited outer dimensions. In addition, it is essential to reduce the thickness of the ceramic dielectric member as thin a dimension as possible, but in practice, it is impossible to reduce the thickness beyond a certain limit because cracks are produced in the ceramic dielectric member due to the retaining forces transmitted through the rotor from the retaining projections extending out of the cylindrical casing. Thus, the prior art ceramic trimmer capacitor is objectionable that the stray capacitance cannot be satisfactorily reduced; the ceramic dielectric member cannot be reduced beyond a certain thickness; and the satisfactory variable capacitance range cannot be obtained.

In order to overcome the above problems, there has been devised and demonstrated a ceramic trimmer capacitor comprising a stator having a semicircular stator electrode attached to the upper surface thereof; a rotor consisting of a first dielectric disk having a high dielectric constant and rotor electrode embedded therein, a second dielectric disk having a low dielectric constant and being overlaid upon the first dielectric disk coaxially thereof and a third dielectric disk having a high dielectric constant and being overlaid over the second dielectric disk; and a rotating shaft inserted into a center hole of the rotor and securely attached thereto so that the rotor may be rotated relative to the stator.

Since the second dielectric disk having a low dielectric constant is interposed between the rotating shaft and the stator electrode, the resulting stray capacitance is almost negligible so that the variable capacitance range may be increased. However the rotor is very complex in construction so that its assembly is time-consuming and cumbersome. In addition it is difficult to attain a reliable electrical connection between the rotor electrode and the rotating shaft. Further, the rotor itself is very susceptible to breakdown due to shocks so that its thickness must be greater than a certain value. Thus, it is difficult to attain a high electrostatic capacitance.

SUMMARY OF THE INVENTION

One of the objects of the present invention is therefore to provide a ceramic trimmer capacitor whose stray capacitance is negligible and which exhibits a high electrostatic capacitance.

Another object of the present invention is to provide a ceramic trimmer capacitor which may be manufactured with high productivity and exhibit excellent mechanical strength.

To the above and other ends, the present invention provides a ceramic trimmer capacitor comprising a stator having a semicircular stator electrode attached to the upper surface thereof; a rotor comprising a dielectric assembly consisting of a disk-shaped ceramic dielectric member having a semicircular dielectric layer formed on the upper surface thereof and having a dielectric constant less than 20 and a coefficient of thermal expansion substantially equal to that of the disk-shaped ceramic dielectric member, and a rotor casing made of a metal, the dielectric assembly being electrically and mechanically connected to the rotor casing; and a cylindrical capacitor casing made of a metal in which are resiliently housed the stator and the rotor.

DESCRIPTION OF THE PREFERRED EMBODIMENT

Prior to the description of the preferred embodiment of the present invention, prior art ceramic trimmer capacitors will be briefly described in order to distinctly and specifically point out the problems thereof.

Figure 1:
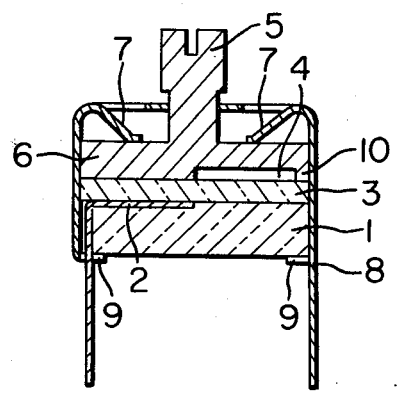
FIG. 1 is a sectional view of a prior art ceramic trimmer capacitor.

FIG. 1 shows a trimmer capacitor used in an electronic circuit of a quartz crystal watch. It comprises in general, a stator 1, a ceramic dielectric member 3, a rotor 6 and a casing 8. The stator 1 is made of an electrically insulating material such as plastic and has a semicircular stator electrode 2 securely attached to the upper surface thereof. The ceramic dielectric member 3 is securely fixed over the upper surface of the stator 1. The rotor 6 is made of a metal and has a semicircular recess 4 formed in the lower surface and an adjusting screw coaxially extended upwards from the upper surface. The rotor 6 is placed upon the ceramic dielectric member 3. The sub-assembly consisting of the stator 1, the dielectric member 3 and the rotor 6 is placed in the casing 8 and is held in position with spring members 7 struck out of the casing 8 and elastically pressed against the upper surface of the rotor 6 and retaining projections 9 also struck out of the casing 8 and securely engages with the lower surface of the stator 1.

The trimmer capacitor of the type described above must be made small in size and thin and have a higher capacitance so that it may be incorporated into a miniature electronic circuit of, for instance, a quartz crystal watch. In other words, the areas of the electrodes must be fully utilized within limited outer dimensions and the ceramic dielectric member 3 must be made as thin as possible.

Figure 2:
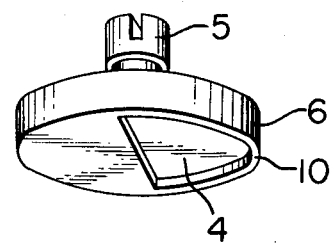
FIG. 2 is a perspective view of a rotor thereof.

However, as shown in FIG. 2, since the semicircular recess 4 is formed in the lower surface of the rotor 6, a semicircular peripheral edge 10 is left on the rotor 6. The edge 10 serves to locate the rotor 6 in parallel with the dielectric member 3, but even when the stator electrode 2 and rotor 6 are so placed as to minimize the capacitance, the stray capacitance is increased because the peripheral edge 10 is located in an opposed relationship with the stator electrode 2 through the ceramic dielectric member 3. As a result, the variable capacitance range is reduced.

Figure 3:
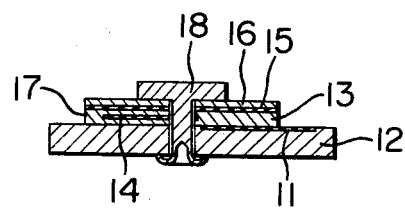
FIG. 3 is a sectional view of another prior art ceramic trimmer capacitor.

Furthermore, since the spring members 7 of the casing 8 are elastically pressed against the rotor 6 which in turn is pressed against the ceramic dielectric member 3, when the latter is made thin, it cracks. Thus, the reduction in thickness of the ceramic dielectric member 3 is limited FIG. 3 shows another prior art trimmer capacitor comprising in general, a stator 12, and a rotor 17. The stator 12 has a semicircular stator electrode 11 securely attached to the upper surface thereof. The rotor 17 comprises a first disk-shaped dielectric member 13 having a high dielectric constant, a rotor electrode 14 embedded in the dielectric member 13, a second disk-shaped dielectric member 15 having a low dielectric constant and overlaid over the first dielectric member 13 coaxially thereof and a third disk-shaped dielectric member 16 having a high dielectric constant and overlaid on the second dielectric member coaxially thereof. A rotating shaft 18 is fitted into a center hole of the rotor 17 and is securely attached thereto.

Since the second dielectric disk 15 having a low dielectric constant is interposed between the head of the rotating shaft 18 and the stator electrode 11, the stray capacitance is negligible and the variable capacitance range may be increased.

However, the rotor 17 is very complex in construction so that its production and assembly is cumbersome. Electrical contact is difficult to attain between the rotor stator 14 and the rotating shaft 18. In addition, the rotor 17 itself is very susceptible to breakdown due to impacts so that it must have a thickness greater than a certain value. Thus, it becomes difficult to obtain a higher electrostatic capacitance.

Figure 4:
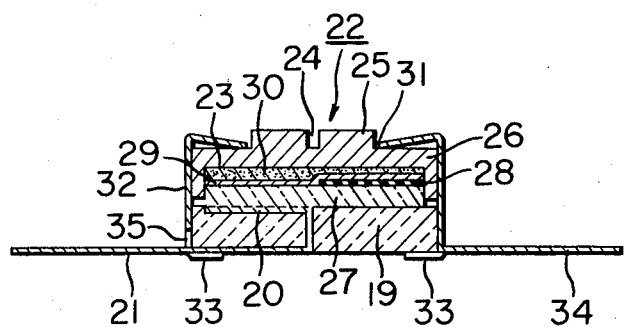
FIG. 4 is a sectional view of a ceramic trimmer capacitor in accordance with the present invention.
Figure 5:
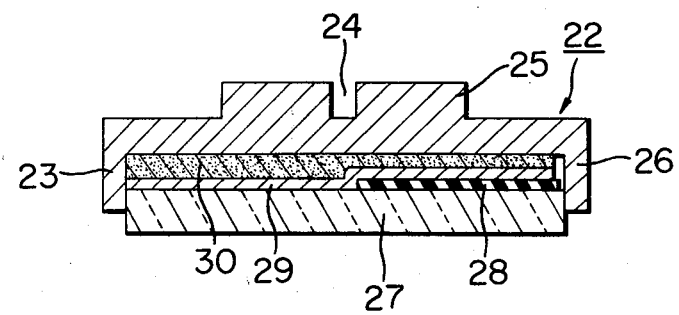
FIG. 5 is a sectional view, on an enlarged scale, of a rotor thereof.
Figure 6:
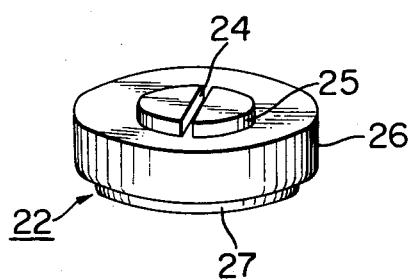
FIG. 6 is a perspective view of the rotor.

The Invention, FIGS. 4–6

Referring to FIGS. 4–6, a ceramic trimmer capacitor in accordance with the present invention comprises, in general, a stator 19, a rotor 22 and a casing 32. As best shown in FIG. 4, the stator 19 is made of an electrically insulating material such as alumina ceramic or plastic and is in the form of a disk. It has a semicircular stator electrode 20 embedded in the upper surface thereof, the embedded electrode 20 being in a coplanar relationship with the rest of the upper surface of the stator 19. A stator terminal 21 is formed integral with the stator electrode 20 and extended vertically along the axis of the stator 19 and then radially outwardly along the lower surface of the stator 19 and through a terminal lead-out opeining 35 formed through the casing 32.

The contstruction of the rotor 22 is best shown in FIGS. 5 and 6. The rotor 22 has a rotor casing 26 generally of inverted U-shape in cross section. The rotor casing 26 has a shallow cylindrical recess 23 formed in the lower surface thereof and a cylindrical adjusting head or projection 25 which is extended upwardly from the top surface and formed with a diametrical slot 24 for engagement with an adjusting screwdriver or the like.

A disk-shaped dielectric member 27 has its upper surface coated with a semicircular dielectric layer 28 which has a dielectric constant less than 20 and a coefficient of thermal expansion substantially equal to that of the disk-shaped ceramic dielectric member 27. The dielectric layer 28 is made of crystallized glass consisting of zinc oxide, aluminum oxide, anhydrous borax, silicon oxide and a very small amount of zirconium oxide or aluminum fluoride. The upper surfaces of the disk-shaped dielectric member 27 and the dielectric layer 28 are brazed with a rotor electrode 29.

The disk-shaped dielectric member 27 with the above construction is snugly fitted into the cylindrical recess 23 of the rotor casing 26 and securely bonded thereto with adhesive 30, whereby the rotor 22 is assembled.

The stator 19 and the rotor 22 are placed in the casing 32 made of an elastic metal. The casing 32 has an opening 31 which is formed through the top of the casing and through which is extended the adjusting head or projection 25 of the rotor 22. The annular top surface of the casing 32 surrounding the adjusting head or projection 25 is downwardly bent and elastically pressed against the upper surface of the rotor 22 adjacent to the adjusting head 25. Retaining projections 33 are struck out of the lower edge of the casing 32 and are brought into resilient contact with the lower surface of the stator 19. A rotor terminal 34 is formed integral with the casing 32 and extended radially outwardly from the lower edge thereof.

The rotor electrode 29 is electrically connected to the rotor casing 26 through the adhesive 30 which is electrically conductive, and the annular top surface of the casing 32 pressed against the upper surface of the rotor casing 26 is electrically connected to the rotor terminal 34.

In fine adjustment, one inserts a screwdriver into the slot 24 of the adjusting head 25 and rotates the rotor 22 so that the overlapping area between the semicircular stator electrode 20 and the rotor electrode 29 may be adjusted, whereby a desired electrostatic capacitance may be attained.

As described above, according to the present invention, the assembly of the rotor may be greatly facilitated as compared with the prior art trimmer capacitors because the disk-shaped ceramic dielectric member with the semicircular dielectric layer and the rotor electrode is bonded with the electrically conductive adhesive to the rotor casing. Capacitance exists between the stator electrode and the rotor electrode except a portion over the semicircular dielectric layer. Even when the ceramic dielectric disk is thin, its mechanical strength may be satisfactorily reinforced by the rotor electrode and the rotor casing and a high electrostatic capacitance may be attained. Since the semicircular dielectric layer having a low dielectric constant is coated over the disk-shaped ceramic dielectric member, stray capacitance may be made negligible so that a minimum capacitance may be made almost zero and consequently, the variable capacitance range may be remarkably increased.

In summary, the ceramic trimmer capacitor, in accordance with the present invention, is easy to manufacture at less cost, is compact in size and thin and highly reliable and dependable in operation and exhibits excellent characteristics.

What is claimed is:

1. A ceramic trimmer capacitor characterized by the provision of
   (a) a stator having a semicircular stator electrode on the upper surface thereof;
   (b) a rotor comprising a disk-shaped ceramic dielectric member having a semicircular dielectric layer which is coated over the upper surface thereof and which has a dielectric constant less than 20 and a coefficient of thermal expansion substantially equal to that of said disk-shaped ceramic dielectric member and a rotor electrode overlaid over the whole upper surface of said disk-shaped ceramic dielectric member including said dielectric layer, and
   a rotor casing made of a metal and formed with an adjusting head or projection extended upwardly from the top surface thereof, said disk-shaped ceramic dielectric member being received in said rotor casing and electrically and mechanically connected thereto; and
   (c) a cylindrical casing made of a metal, said stator and said rotor being placed in said cylindrical casing and brought into elastic contact therewith.

2. A ceramic trimmer capacitor as set forth in claim 1 further characterized in that said rotor casing has a cylindrical recess formed in the lower surface thereof, and said disk-shaped ceramic dielectric member with said semicircular dielectric layer and said stator electrode is placed in said cylindrical recess.

3. A ceramic trimmer capacitor as set forth in claim 1 further characterized in that
   a stator electrode terminal is extended from said stator electrode along the axis of said stator and then radially outwardly along the lower surface thereof.

4. A ceramic trimmer capacitor as set forth in claim 1 further characterized in that
   a rotor terminal is formed integral with said cylindrical casing and extended radially outwardly thereof.

5. A ceramic trimmer capacitor as set forth in claim 1 further characterized in that
   said dielectric layer formed upon said disk-shaped ceramic dielectric member consists of zinc oxide, aluminum oxide, hydrous borax, silicon oxide and a very small amount of zirconium oxide or aluminum fluoride.

* * * * *

UNITED STATES PATENT OFFICE
CERTIFICATE OF CORRECTION

Patent No. 4,181,923     Dated January 1, 1980

Inventor(s) Toshio Tatsumi, et al

It is certified that error appears in the above-identified patent and that said Letters Patent are hereby corrected as shown below:

Column 1, line 39: Before "that" insert --in--.

Column 3, line 62: "opeining" should be --opening--.

line 63: "contstruction" should be --construction--.

Signed and Sealed this

Fifth Day of August 1980

[SEAL]

Attest:

SIDNEY A. DIAMOND

Attesting Officer    Commissioner of Patents and Trademarks